US011163712B2

United States Patent
Tseng

(10) Patent No.: US 11,163,712 B2
(45) Date of Patent: Nov. 2, 2021

(54) ELECTRONIC SWITCHING DEVICE

(71) Applicant: Cheng Uei Precision Industry Co., Ltd., New Taipei (TW)

(72) Inventor: Chin Huang Tseng, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/844,250

(22) Filed: Apr. 9, 2020

(65) Prior Publication Data

US 2020/0371981 A1 Nov. 26, 2020

Related U.S. Application Data

(60) Provisional application No. 62/852,323, filed on May 24, 2019.

(30) Foreign Application Priority Data

Nov. 19, 2019 (TW) ................................. 108141887

(51) Int. Cl.
*G06F 13/38* (2006.01)
*G06F 13/40* (2006.01)

(52) U.S. Cl.
CPC ........ *G06F 13/385* (2013.01); *G06F 13/4022* (2013.01); *G06F 2213/0042* (2013.01)

(58) Field of Classification Search
CPC ............... G06F 13/385; G06F 13/4022; G06F 2213/0042
See application file for complete search history.

(56) References Cited

U.S. PATENT DOCUMENTS

| 2008/0162980 A1* | 7/2008 | Dahan ................. G06F 13/1694 713/601 |
| 2017/0269922 A1* | 9/2017 | Tian ...................... G06F 13/385 |
| 2018/0048094 A1* | 2/2018 | Cornelius .......... H01R 13/6473 |
| 2019/0082968 A1* | 3/2019 | Karnik .................... G06F 3/016 |

* cited by examiner

*Primary Examiner* — Idriss N Alrobaye
*Assistant Examiner* — Ronald T Modo
(74) *Attorney, Agent, or Firm* — Lin & Associates Intellectual Property, Inc.

(57) ABSTRACT

An electronic switching device includes a USB interface, a multifunctional module, a microprogrammed control module, a recognition program unit and a transient memory. The USB interface is connected with a computer through a USB cable. The multifunctional module includes a UART circuit unit and a power supply. The UART circuit unit and the power supply are disposed in the electronic switching device. The UART circuit unit is connected between the USB interface and the microprogrammed control module. The recognition program unit is disposed in the microprogrammed control module. The transient memory is disposed in the microprogrammed control module. The microprogrammed control module stores an initial value of the UART circuit unit or a start value of the UART circuit unit in the transient memory to dynamically switch UART function statuses of the UART circuit unit.

13 Claims, 3 Drawing Sheets

ELECTRONIC SWITCHING DEVICE

CROSS-REFERENCE TO RELATED APPLICATION

This application claims the priorities of U.S. provisional patent application No. 62/852,323, filed on May 24, 2019 and Taiwan patent application no. 108141887, filed on Nov. 19, 2019, which are incorporated herewith by reference.

BACKGROUND OF THE INVENTION

1. Field of the Invention

The present invention generally relates to a switching device, and more particularly to an electronic switching device applied to an electronic product.

2. The Related Art

Usually, an electronic switching device is widely used in various electronic products. A conventional electronic switching device is chargeable. The conventional electronic switching device is driven by a rechargeable battery, and the rechargeable battery provides electricity for the conventional electronic switching device.

As is known to all, when the conventional electronic switching device is applied in the electronic product, such as a cell phone, after the conventional electronic switching device is used, the battery need charging.

The conventional electronic switching device includes a connection interface and a power element. The connection interface is connected with an inside of the conventional electronic switching device. The power element is disposed in the conventional electronic switching device. The power element is disposed in the conventional electronic switching device, and the power element is connected with the connection interface. A computer provides the electricity for the conventional electronic switching device to charge the conventional electronic switching device through a computer interface and the connection interface.

The conventional electronic switching device further includes a power and UART (Universal Asynchronous Receiver/Transmitter) module disposed in the conventional electronic switching device. On one hand, in order to make the conventional electronic switching device capable of being charged by the computer, the connection interface is connected with the power element. On the other hand, in order to make the conventional electronic switching device capable of being in communication with the computer, the power and UART module is connected with the connection interface, the power and UART module is a part of a hardware of the conventional electronic switching device to proceed with a data transmission switch between a serial communication and a parallel communication, so that the computer supplies the electricity for the conventional electronic switching device to charge the conventional electronic switching device through the connection interface, and simultaneously the conventional electronic switching device is in communication with the computer for satisfying factory production tests, health management and other applications.

However, when the connection interface of the conventional electronic switching device is connected with the computer to make the conventional electronic switching device be charged by the computer, the computer applies a windows operating system, a display screen of the computer will display information that device is unrecognized. Moreover, when the conventional electronic switching device is connected with the computer, the display screen will display the information of device being unrecognized on condition that the connection interface of the conventional electronic switching device has UART function and starts the UART function. That the computer interface of the computer transmits and receives USB signals is a cause of the above-mentioned phenomenon, and when the connection interface of the conventional electronic switching device receives UART signals and then transmits the UART signals to the computer, the windows operating system of the computer has no way of recognizing the UART signals, and the display screen of the computer displays the information that device is unrecognized.

Thus, an innovative electronic switching device applied in an electronic product is essential to be provided, after a USB interface of the innovative electronic switching device is connected with the computer through a USB cable, a recognition program unit is urgently needed, and the recognition program unit is capable of switching UART function statuses of the innovative electronic switching device.

SUMMARY OF THE INVENTION

An object of the present invention is to provide an electronic switching device applied to an electronic product. The electronic switching device includes a USB (Universal Serial Bus) interface, a multifunctional module, a microprogrammed control module, a recognition program unit and a transient memory. The USB interface is connected with a computer through a USB cable. The multifunctional module includes a UART (Universal Asynchronous Receiver/Transmitter) circuit unit and a power supply. The UART circuit unit is connected with the USB interface. The UART circuit unit is in communication with the computer via the USB interface. The power supply is electrically connected with the USB interface, and the computer charges the power supply by the USB interface. The UART circuit unit and the power supply are disposed in the electronic switching device. The UART circuit unit is connected between the USB interface and the microprogrammed control module. The recognition program unit is disposed in the microprogrammed control module. The recognition program unit stores a recognition software program. The recognition software program is compatible with an operating system of the computer. The transient memory is disposed in the microprogrammed control module. The microprogrammed control module stores an initial value of the UART circuit unit or a start value of the UART circuit unit in the transient memory to dynamically switch UART function statuses of the UART circuit unit to stop or start a UART function by the recognition software program of the recognition program unit. The USB interface has four pins which are a first pin, a second pin, a third pin and a fourth pin, the electronic switching device includes a peripheral circuit system which includes a first bidirectional diode, a second bidirectional diode and a third bidirectional diode, the first pin is connected with a positive pole of the first bidirectional diode through a first testing point, the second pin has a transmitting function, and the second pin is connected with a positive pole of the third bidirectional diode, the third pin has a receiving function, and the third pin is connected with a positive pole of the second bidirectional diode, each of the first bidirectional diode, the second bidirectional diode and the third bidirectional diode has a ground foot, the ground feet of the first bidirectional diode, the second bidirectional diode and the third bidirectional diode are connected with one another and are connected with ground, the ground feet of the first bidirectional diode, the second bidirectional diode and the third bidirectional diode are connected with a second testing point, the second testing point is connected with the ground.

As described above, the dynamic switching method applied to the electronic switching device is provided in the present invention, after the USB interface of the electronic switching device is connected with the computer through the USB cable, the recognition program unit of the microprogrammed control module of the electronic switching device switches the UART function statuses of the electronic switching device. Furthermore, the electronic switching device has multiple advantages, the power supply is connected with the USB interface, so that the computer provides electricity to the power supply of the electronic switching device to charge the electronic switching device by the USB cable, the UART circuit unit is connected with the USB interface to make the UART circuit unit of the electronic switching device in communication with the computer for satisfying factory production tests, health management and other applications. In addition, when the computer is connected with the USB interface to charge the electronic switching device through the USB cable, a display screen of the computer will be without displaying information that the device is unrecognized.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
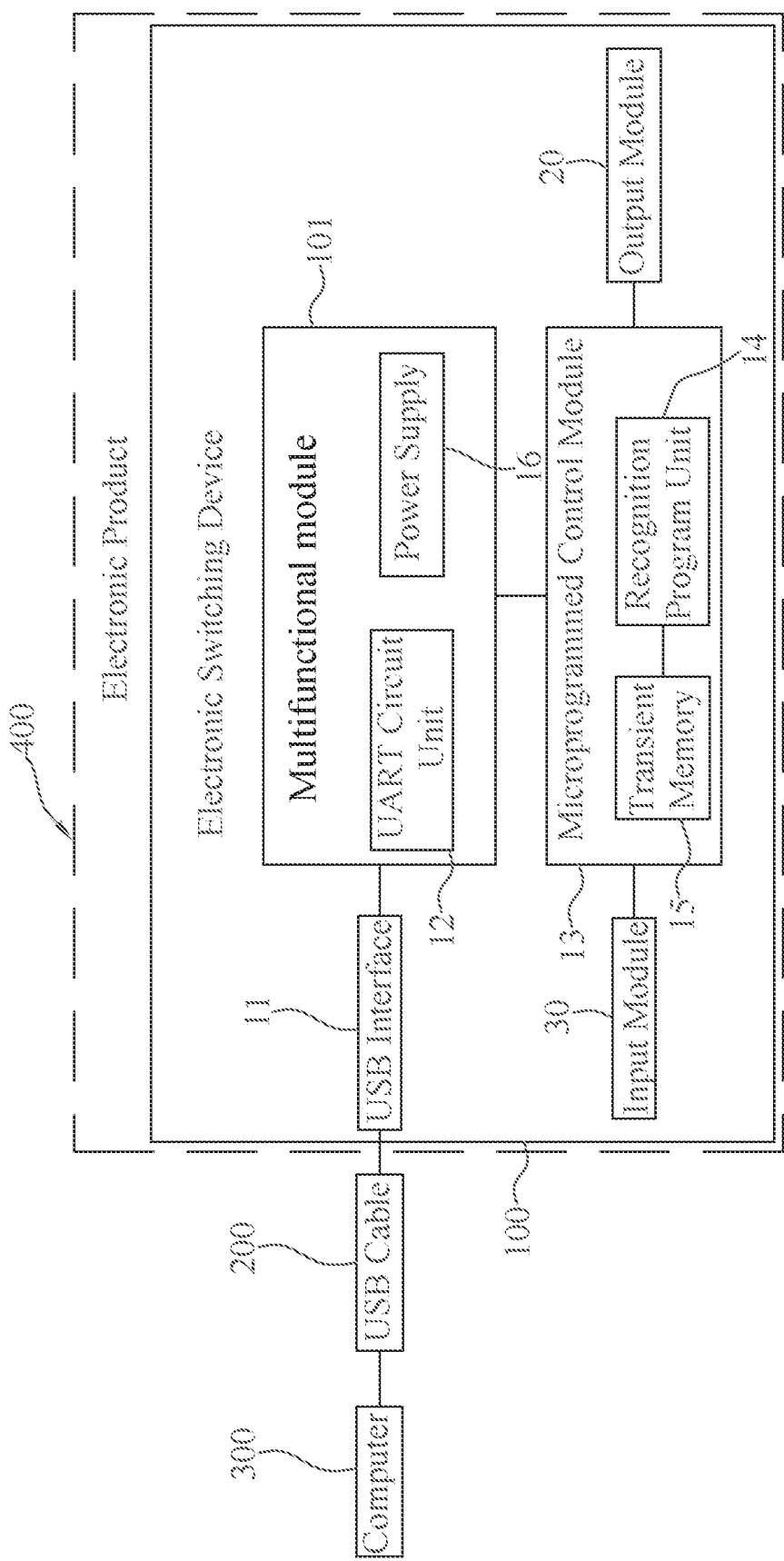
FIG. 1 is a block diagram showing that a USB interface of an electronic switching device of an electronic product in accordance with a preferred embodiment of the present invention is connected with a computer through a USB cable.
Figure 2:
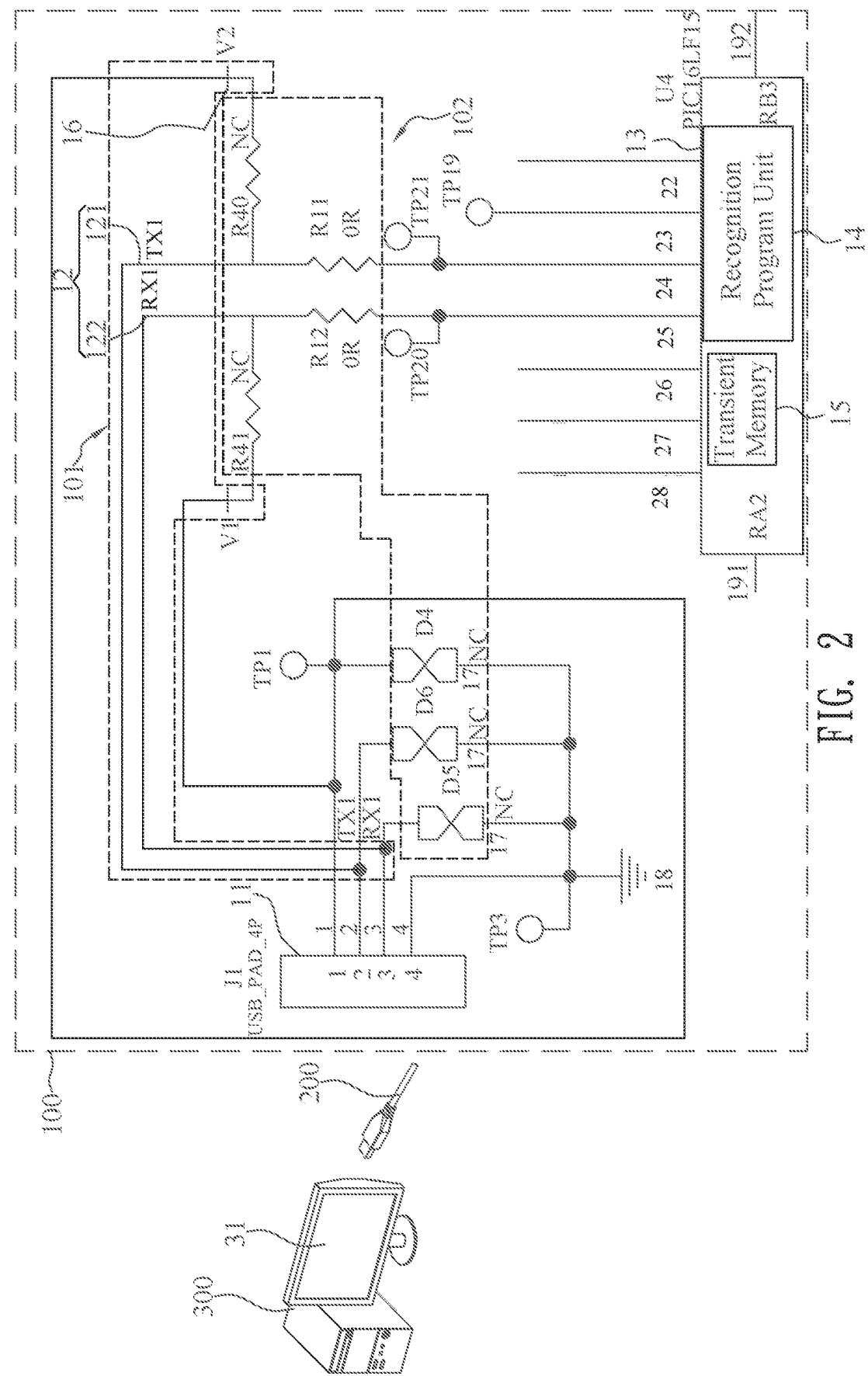
FIG. 2 is a diagrammatic drawing showing that the USB interface of the electronic switching device in accordance with the preferred embodiment of the present invention is connected with the computer through the USB cable.
Figure 3:
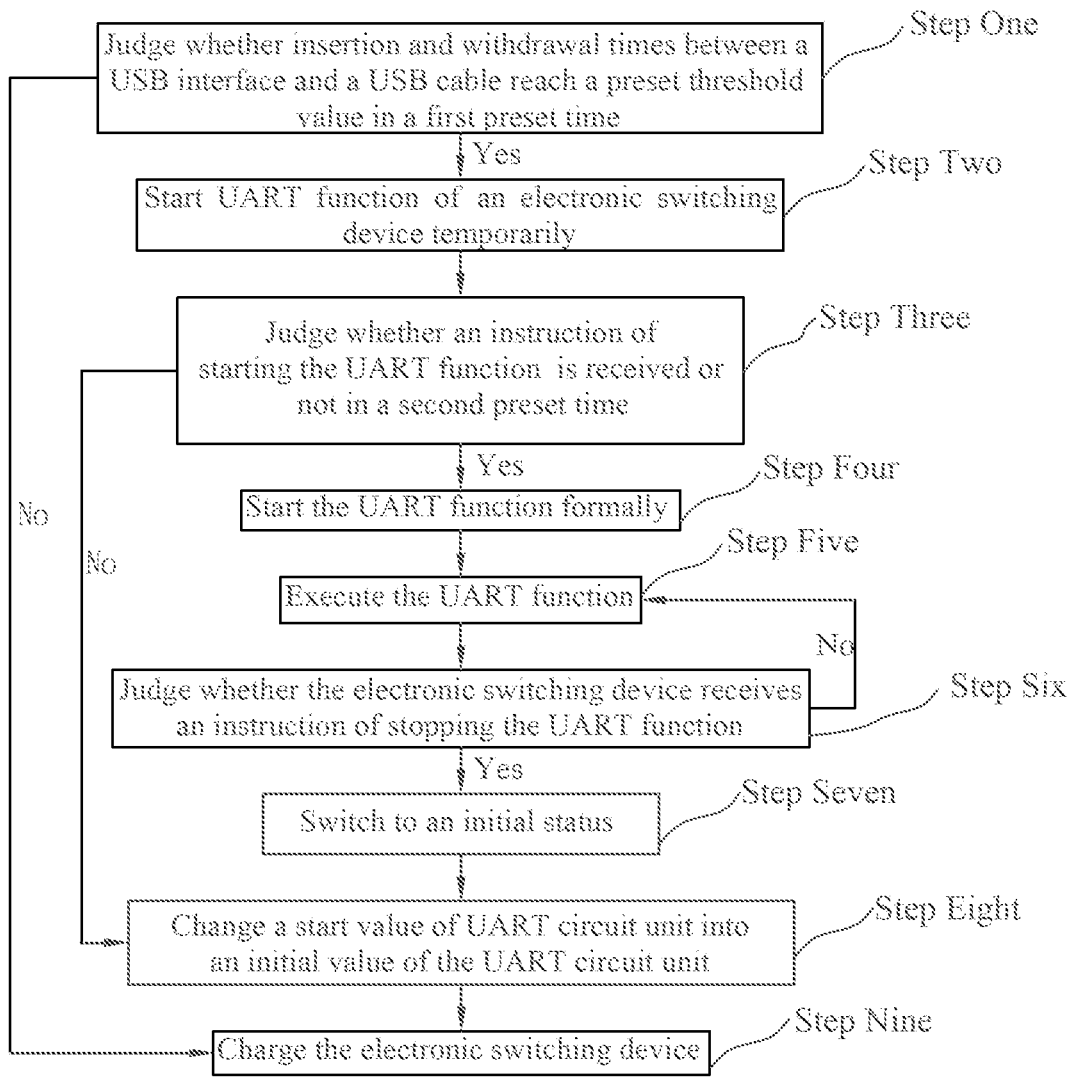
FIG. 3 is a flowchart of a dynamic switching method applied to the electronic switching device in accordance with the preferred embodiment of the present invention.

With reference to FIG. 1 to FIG. 3, an electronic switching device 100 and a dynamic switching method applied thereto in accordance with a preferred embodiment of the present invention are shown. The electronic switching device 100 is applied to an electronic product 400. The electronic switching device 100 includes a USB (Universal Serial Bus) interface 11, a multifunctional module 101 which includes a UART (Universal Asynchronous Receiver/Transmitter) circuit unit 12 and a power supply 16, a microprogrammed control module 13, a recognition program unit 14 switching UART function statuses of the UART circuit unit 12 of the electronic switching device 100, and a transient memory 15 disposed in the microprogrammed control module 13. The USB interface 11 of the electronic switching device 100 is connected with a computer 300 through a USB cable 200. The UART circuit unit 12 and the power supply 16 are disposed in the electronic switching device 100. The power supply 16 is chargeable.

After the USB interface 11 of the electronic switching device 100 is connected with the computer 300 through the USB cable 200, the electronic switching device 100 is charged, and the computer 300 applies a windows operating system. The UART circuit unit 12 is connected with the USB interface 11, and the UART circuit unit 12 is in communication with the computer 300 via the USB interface 11. The power supply 16 is electrically connected with the UART circuit unit 12. The power supply 16 is electrically connected with the USB interface 11, and the computer 300 charges the power supply 16 by the USB interface 11. The recognition program unit 14 stores a recognition software program, and the recognition software program is compatible with the operating system of the computer 300. The UART function statuses of the UART circuit unit 12 of the electronic switching device 100 are dynamically switched by the recognition software program of the recognition program unit 14 of the microprogrammed control module 13 of the electronic switching device 100 to start or stop a UART function. Specifically, the microprogrammed control module 13 stores an initial value of the UART circuit unit 12 or a start value of the UART circuit unit 12 in the transient memory 15 to dynamically switch the UART function statuses of the UART circuit unit 12 to stop or start the UART function by the recognition software program of the recognition program unit 14. The UART circuit unit 12 is connected between the USB interface 11 and the microprogrammed control module 13. The USB cable 200 is connected between the electronic switching device 100 and the computer 300. The power supply 16 is connected with the USB interface 11, and the power supply 16 is charged by the computer 300.

The electronic switching device 100 of the electronic product 400 further includes an output module 20 and an input module 30. The output module 20 is connected with an output end 192 of the microprogrammed control module 13, and the input module 30 is connected with an input end 191 of the microprogrammed control module 13. The electronic switching device 100 of the electronic product 400 applying the dynamic switching method to dynamically switch the UART function statuses of the UART circuit unit 12 of the electronic switching device 100 to start or stop the UART function of the UART circuit unit 12 of the electronic switching device 100, and when the USB interface 11 of the electronic switching device 100 receives UART signals and then transmits the UART signals to the computer 300, the windows operating system of the computer 300 is compatible with the recognition software program, and the windows operating system of the computer 300 recognizes the UART signals, so a display screen 31 of the computer 300 is without displaying information that device is unrecognized.

A block diagram showing that the USB interface 11 of the electronic switching device 100 of the electronic product 400 is connected with the computer 300 through the USB cable 200 is shown in FIG. 1. A flowchart of the dynamic switching method applied to the electronic switching device 100 is shown in FIG. 3. The recognition program unit 14 is a system program unit of the electronic switching device 100. A hardware structure of the electronic switching device 100 includes the USB interface 11, the multifunctional module 101 which includes the UART circuit unit 12 and the power supply 16, the microprogrammed control module 13 and a peripheral circuit system 102. The microprogrammed control module 13 is a microcontroller. Specifically, the microprogrammed control module 13 is a microcomputer which is an integrated circuit chip. The microcomputer includes a microprocessor, a storage, a timer, a variety of input and output interfaces, and so on. The microprocessor, the storage, the timer, the variety of the input and output interfaces, and so on are integrated to the integrated circuit chip. Or the microcomputer includes the microprocessor, the storage, a counter, the variety of the input and output interfaces, and so on. The microprocessor, the storage, the counter, the variety of the input and output interfaces, and so on are integrated to the integrated circuit chip. The microprogrammed control module 13 has a motor foot 22, a current foot 23, an ICSPCLK (In-Circuit Serial Programming Clock) foot 24, an ICSPDAT (In-Circuit Serial Programming Data) foot 25, an ICRST (Integrated Circuit Reset) foot 26, a battery voltage foot 27 and a LED foot 28. The motor foot 22, the current foot 23, the ICSPCLK foot 24, the ICSPDAT foot 25, the ICRST foot 26, the battery voltage foot 27 and the LED foot 28 are disposed towards the multifunctional module 101, and the motor foot 22, the current foot 23, the ICSPCLK foot 24, the ICSPDAT foot 25, the ICRST foot 26, the battery voltage foot 27 and the LED foot 28 are spaced from the multifunctional module 101. In the preferred embodiment, the microprogrammed control module 13 is a single chip microcomputer. The microprogrammed control module 13 is a programmable interrupt controller and the microprogrammed control module 13 belongs to PIC16LF series. The recognition program unit 14 stores the recognition software program, and the recognition program unit 14 is disposed in the microprogrammed control module 13 of the electronic switching device 100.

In the preferred embodiment, the USB interface 11 has four pins which are a first pin 1, a second pin 2, a third pin 3 and a fourth pin 4. The peripheral circuit system 102 includes a first bidirectional diode D4, a second bidirectional diode D5 and a third bidirectional diode D6. The first pin 1 is connected with a positive pole of the first bidirectional diode D4 through a first testing point TP1. The second pin 2 has a transmitting function, and the second pin 2 is connected with a positive pole of the third bidirectional diode D6. The third pin 3 has a receiving function, and the third pin 3 is connected with a positive pole of the second bidirectional diode D5. Each of the first bidirectional diode D4, the second bidirectional diode D5 and the third bidirectional diode D6 has a ground foot 17 which is used for connecting with ground 18. The ground feet 17 of the first bidirectional diode D4, the second bidirectional diode D5 and the third bidirectional diode D6 are connected with one another, and the ground feet 17 of the first bidirectional diode D4, the second bidirectional diode D5 and the third bidirectional diode D6 are connected with the ground 18. The ground feet 17 of the first bidirectional diode D4, the second bidirectional diode D5 and the third bidirectional diode D6 are connected with a second testing point TP3. The second testing point TP3 is connected with the ground 18.

In the preferred embodiment, the UART circuit unit 12 has a transmitting unit 121 and a receiving unit 122. The receiving unit 122 is spaced from the transmitting unit 121. The receiving unit 122 is parallel with the transmitting unit 121. One end of the transmitting unit 121 is connected with the second pin 2 of the USB interface 11. One end of the receiving unit 122 is connected with the third pin 3 of the USB interface 11. The power supply 16 includes a first voltage end V1 and a second voltage end V2. The first voltage end V1 and the second voltage end V2 are respectively connected with the first pin 1 of the USB interface 11. The peripheral circuit system 102 further includes a first resistor R41, a second resistor R40, a third resistor R12 and a fourth resistor R11. The third resistor R12 and the fourth resistor R11 are 0Ω. One end of the first resistor R41 is connected with the first voltage end V1, and the other end of the first resistor R41 is unconnected. One end of the second resistor R40 is connected with the second voltage end V2, and the other end of the second resistor R40 is unconnected. The other end of the transmitting unit 121 is connected with one end of the fourth resistor R11. The other end of the fourth resistor R11 is connected with the ICSPCLK (In-Circuit Serial Programming Clock) foot 24 of the microprogrammed control module 13 and a third testing point TP21. The other end of the fourth resistor R11 is adjacent to the third testing point TP21. The other end of the transmitting unit 121 is connected with the ICSPCLK (In-Circuit Serial Programming Clock) foot 24 of the microprogrammed control module 13 and the third testing point TP21 through the fourth resistor R11. The fourth resistor R11 and the third testing point TP21 are located between the microprogrammed control module 13 and the multifunctional module 101. The other end of the receiving unit 122 is connected with one end of the third resistor R12. The other end of the third resistor R12 is connected with the ICSPDAT foot 25 of the microprogrammed control module 13 and a fourth testing point TP 20. The other end of the third resistor R12 is adjacent to the fourth testing point TP 20. The other end of the receiving unit 122 is connected with the ICSPDAT foot 25 of the microprogrammed control module 13 and the fourth testing point TP 20 through the third resistor R12. The third resistor R12 and the fourth testing point TP 20 are located between the microprogrammed control module 13 and the multifunctional module 101. A straight-line distance between a point of the microprogrammed control module 13, and the third testing point TP21 and the fourth testing point TP20 is shorter than a straight-line distance between the point of the microprogrammed control module 13, and the third resistor R12 and the fourth resistor R11. The third resistor R12 is located between the other end of the receiving unit 122 and the fourth testing point TP20. The fourth resistor R11 is located between the other end of the transmitting unit 121 and the third testing point TP21. The first voltage end V1 is disposed between the first testing point TP1 and the second voltage end V2. The current foot 23 is connected with a fifth testing point TP19. The third testing point TP21 and the fourth testing point TP20 are aligned along a transverse direction. The third resistor R12 and the fourth resistor R11 are aligned along the transverse direction.

Referring to FIG. 1 to FIG. 3 again, the dynamic switching method is applied to the electronic switching device 100 of the electronic product 400. After the USB interface 11 of the electronic switching device 100 is connected with the computer 300 through the USB cable 200, the UART function statuses of the UART circuit unit 12 of the electronic switching device 100 are dynamically switched by the recognition software program of the recognition program unit 14 of the microprogrammed control module 13 of the electronic switching device 100 to start or stop the UART function. Specific steps of the dynamic switching method of the electronic switching device 100 are described as follows.

Step one: in a first preset time, judge whether insertion and withdrawal times between the USB interface 11 of the electronic switching device 100 and the USB cable 200 reach a preset threshold value by the recognition software program of the recognition program unit 14 operating system, if the insertion and withdrawal times between the USB interface 11 of the electronic switching device 100 and the USB cable 200 reach the preset threshold value in the first preset time, execute step two, if the insertion and withdrawal times between the USB interface 11 of the electronic switching device 100 and the USB cable 200 are without reaching the preset threshold value in the first preset time, execute step nine. The first preset time is six seconds. The preset threshold value of the insertion and withdrawal times is three times.

That is to say, a purpose of the step one is that judge whether a request of starting the UART function of the electronic switching device 100 temporarily is reached by the recognition program unit 14. Within six seconds, the recognition program unit 14 judges whether the USB cable 200 is inserted into the USB interface 11 of the electronic switching device 100 for three times and the USB cable 200 is withdrawn from the USB interface 11 of the electronic switching device 100 for two times. If the recognition program unit 14 judges truly, execute step two, if the recognition program unit 14 judges falsely, execute step nine: charge the electronic switching device 100 by the computer 300, and the electronic switching device 100 is charged through the USB cable 200.

A specific judging process is described as follows, within six seconds, after the USB cable 200 is inserted into the USB interface 11 of the electronic switching device 100 for the first time, the recognition program unit 14 judges whether the USB cable 200 is withdrawn from the USB interface 11 of the electronic switching device 100, if the USB cable 200 is withdrawn from the USB interface 11 of the electronic switching device 100, the USB cable 200 is inserted into the USB interface 11 of the electronic switching device 100 again, once more, the USB cable 200 is withdrawn from the USB interface 11 of the electronic switching device 100, and then the USB cable 200 is inserted into the USB interface 11 of the electronic switching device 100 for one more time.

Step two: start the UART function of the electronic switching device 100 temporarily by virtue of the recognition program unit 14 changing a value stored in the transient memory 15 of the microprogrammed control module 13 of the electronic switching device 100, and then execute step three. For example, the initial value of the UART circuit unit 12 is 0x00, and the initial value of the UART circuit unit 12 is stored in the transient memory 15 of the microprogrammed control module 13 of the electronic switching device 100, the initial value of the UART circuit unit 12 is changed into the start value of the UART circuit unit 12, the start value of the UART circuit unit 12 is stored in the transient memory 15 of the microprogrammed control module 13 of the electronic switching device 100, the start value of the UART circuit unit 12 is 0xFF, so that the UART function is started.

Step three: the recognition program unit 14 judges whether an instruction of starting the UART function sent is received or not in a second preset time. The instruction of starting the UART function is sent from the computer 300. The instruction of starting the UART function is sent by the USB cable 200. The second preset time is five seconds. If the instruction of starting the UART function is received, execute step four, if the instruction of starting the UART function is without being received, execute step eight, the recognition program unit 14 changes the start value of the UART circuit unit 12 into the initial value of the UART circuit unit 12.

After the recognition program unit 14 changes the start value of the UART circuit unit 12 into the initial value of the UART circuit unit 12 stored in the transient memory 15, so that the UART function is stopped.

Step four: if the recognition program unit 14 receives the instruction of starting the UART function in the second preset time, the recognition program unit 14 starts the UART function of the electronic switching device 100 formally, and then execute step five.

Step five: the recognition program unit 14 executes the UART function of the electronic switching device 100 by virtue of the recognition program unit 14 receiving the instruction of starting the UART function, and then execute step six. The UART function is applied in factory production tests, health management and other applications.

Step six: judge whether the electronic switching device 100 receives an instruction of stopping the UART function or not by the recognition program unit 14, and the instruction of stopping the UART function is sent from the computer 300, if the electronic switching device 100 receives the instruction of stopping the UART function, execute step seven, the recognition program unit 14 stops the UART function of the electronic switching device 100, the electronic switching device 100 is switched to a general status, if the electronic switching device 100 is without receiving the instruction of stopping the UART function, execute the step five.

Step seven: switch to an initial status, initialize program variates for preparing to change the start value of the UART circuit unit 12, after completing the preparation for changing the start value of the UART circuit unit 12, automatically execute step eight.

Step eight: change the start value of the UART circuit unit 12 into the initial value of the UART circuit unit 12 by the recognition program unit 14. After completing executing the step eight, automatically execute step nine.

Step nine: charge the electronic switching device 100 by the computer 300, and the electronic switching device 100 is charged through the USB cable 200.

As described above, the dynamic switching method applied to the electronic switching device 100 is provided in the present invention, after the USB interface 11 of the electronic switching device 100 is connected with the computer 300 through the USB cable 200, the recognition program unit 14 of the microprogrammed control module 13 of the electronic switching device 100 switches the UART function statuses of the electronic switching device 100. Furthermore, the electronic switching device 100 has multiple advantages, the power supply 16 is connected with the USB interface 11, so that the computer 300 provides electricity to the power supply 16 of the electronic switching device 100 to charge the electronic switching device 100 by the USB cable 200, the UART circuit unit 12 is connected with the USB interface 11 to make the UART circuit unit 12 of the electronic switching device 100 in communication with the computer 300 for satisfying the factory production tests, the health management and other applications. In addition, when the computer 300 is connected with the USB interface 11 to charge the electronic switching device 100 through the USB cable 200, the display screen of the computer 300 will be without displaying the information that the device is unrecognized.

The electronic switching device 100 and the dynamic switching method applied to the electronic switching device 100 which are provided in the present invention have industrial use values, nevertheless, the above-mentioned description is just a description of the preferred embodiment of the present invention, a person whoever is skillful in this skill, may easily proceed with a variety of improvements according to the above-mentioned description, the variety of the improvements completed according to the above-mentioned description still belong to a spirit of the present invention and a patent scope of the present invention limited below.

What is claimed is:

1. An electronic switching device applied to an electronic product, comprising:
   a USB (Universal Serial Bus) interface, the USB interface being connected with a computer through a USB cable;
   a multifunctional module including a UART (Universal Asynchronous Receiver/Transmitter) circuit unit and a power supply, the UART circuit being connected with the USB interface, the UART circuit being in communication with the computer via the USB interface, the power supply being electrically connected with the USB interface, and the computer charging the power supply by the USB interface, the UART circuit unit and the power supply being disposed in the electronic switching device;
   a microprogrammed control module, the UART circuit unit being connected between the USB interface and the microprogrammed control module;
   a recognition program unit disposed in the microprogrammed control module, the recognition program unit storing a recognition software program, the recognition software program being compatible with an operating system of the computer; and
   a transient memory disposed in the microprogrammed control module, the microprogrammed control module storing an initial value of the UART circuit unit or a start value of the UART circuit unit in the transient memory to dynamically switch UART function statuses of the UART circuit unit to stop or start a UART function by the recognition software program of the recognition program unit;
   wherein the USB interface has four pins which are a first pin, a second pin, a third pin and a fourth pin, the electronic switching device includes a peripheral circuit system which includes a first bidirectional diode, a second bidirectional diode and a third bidirectional diode, the first pin is connected with a positive pole of the first bidirectional diode through a first testing point, the second pin has a transmitting function, and the second pin is connected with a positive pole of the third bidirectional diode, the third pin has a receiving function, and the third pin is connected with a positive pole of the second bidirectional diode, each of the first bidirectional diode, the second bidirectional diode and the third bidirectional diode has a ground foot, the ground feet of the first bidirectional diode, the second bidirectional diode and the third bidirectional diode are connected with one another and are connected with ground, the ground feet of the first bidirectional diode, the second bidirectional diode and the third bidirectional diode are connected with a second testing point, the second testing point is connected with the ground.

2. The electronic switching device as claimed in claim 1, further comprising an output module and an input module, the output module being connected with an output end of the microprogrammed control module, and the input module being connected with an input end of the microprogrammed control module.

3. The electronic switching device as claimed in claim 1, wherein the UART circuit unit has a transmitting unit and a receiving unit, the receiving unit is spaced from the transmitting unit, and the receiving unit is parallel with the transmitting unit, one end of the transmitting unit is connected with the second pin of the USB interface, one end of the receiving unit is connected with the third pin of the USB interface, the peripheral circuit system further includes a third resistor and a fourth resistor, the third resistor and the fourth resistor are 0Ω, the other end of the transmitting unit is connected with one end of the fourth resistor, the other end of the fourth resistor is connected with an ICSPCLK (In-Circuit Serial Programming Clock) foot of the microprogrammed control module and a third testing point, the other end of the transmitting unit is connected with the ICSPCLK foot of the microprogrammed control module and the third testing point through the fourth resistor, the other end of the receiving unit is connected with one end of the third resistor, the other end of the third resistor is connected with an ICSPDAT (In-Circuit Serial Programming Data) foot of the microprogrammed control module and a fourth testing point, the other end of the receiving unit is connected with the ICSPDAT foot of the microprogrammed control module and the fourth testing point through the third resistor, a straight-line distance between a point of the microprogrammed control module, and the third testing point and the fourth testing point is shorter than a straight-line distance between the point of the microprogrammed control module, and the third resistor and the fourth resistor.

4. The electronic switching device as claimed in claim 1, wherein the power supply includes a first voltage end and a second voltage end, the first voltage end and the second voltage end are respectively connected with the first pin of the USB interface, the first voltage end is disposed between the first testing point and the second voltage end.

5. The electronic switching device as claimed in claim 1, wherein the microprogrammed control module is a microcomputer which is an integrated circuit chip.

6. The electronic switching device as claimed in claim 1, wherein the UART function is applied in factory production tests and health management.

7. The electronic switching device as claimed in claim 1, wherein the computer applies a windows operating system.

8. The electronic switching device as claimed in claim 1, wherein the power supply includes a first voltage end and a second voltage end, the peripheral circuit system further includes a first resistor and a second resistor, one end of the first resistor is connected with the first voltage end, and the other end of the first resistor is unconnected, one end of the second resistor is connected with the second voltage end, and the other end of the second resistor is unconnected.

9. The electronic switching device as claimed in claim 3, wherein the third resistor is located between the other end of the receiving unit and the fourth testing point, the fourth resistor is located between the other end of the transmitting unit and the third testing point.

10. The electronic switching device as claimed in claim 3, wherein the third testing point and the fourth testing point are aligned along a transverse direction.

11. The electronic switching device as claimed in claim 3, wherein the third resistor and the fourth resistor are aligned along a transverse direction.

12. The electronic switching device as claimed in claim 3, wherein the other end of the third resistor is adjacent to the fourth testing point.

13. The electronic switching device as claimed in claim 3, wherein the other end of the fourth resistor is adjacent to the third testing point.

* * * * *